INVENTORS
ROCCO R. ODDO
FREDERICK H. JOPLIN

BY Karl A. Oholike

ATTORNEY

June 30, 1970 R. R. ODDO ET AL 3,518,663
SHAFT ANGLE ENCODER WITH BRUSH SELECTION LOGIC CIRCUITRY
Filed Sept. 29, 1967 5 Sheets-Sheet 2

INVENTORS
ROCCO R. ODDO
FREDERICK H. JOPLIN
BY
Karl A. Ohralik
ATTORNEY

United States Patent Office 3,518,663
Patented June 30, 1970

3,518,663
SHAFT ANGLE ENCODER WITH BRUSH SELECTION LOGIC CIRCUITRY
Rocco R. Oddo, Brooklyn, N.Y., and Frederick H. Joplin, Sparta, N.J., assignors to Singer General Precision, Inc., a corporation of Delaware
Filed Sept. 29, 1967, Ser. No. 671,679
Int. Cl. G08c 9/08
U.S. Cl. 340—347
12 Claims

ABSTRACT OF THE DISCLOSURE

An analog-to-digital code converter of the shaft angle encoder type is provided wherein analog input information in the form of an input shaft angle is converted into an unambiguous digital output in any desired code. The analog information is first converted into a decimal coded digital output by a shaft angle encoder and then converted into the desired code by a simple diode code conversion matrix. A separate shaft angle encoder or "decade" is employed for each digit of the decimal coded "word" output of the analog-to-digital code converter.

The described shaft angle encoder portion of the converter comprises a rotatable coded drum having electrically conductive segments which are adapted to be energized by a first or "interrogation" track on the drum to permit both static and dynamic interrogation, with either a continuous or pulsed interrogation signal. Ten output brushes are spaced around the periphery of the drum at 36° intervals and are energized with a make-before-break operation by a conductive segment in a second track on the drum to provide decimal coded electric output signals representing the analog drum positions. A brush selection logic circuit comprising ten AND gates and a flip-flop circuit is utilized with the shaft angle to provide unambiguous decimal coded output signals. Each AND gate has a first input connected to one of the ten output brushes and a second input connected to one of the outputs of the flip-flop circuit, so that the first stable operating state of the flip-flop energizes the second inputs of alternate AND gates and the second stable operating state energizes the second inputs of the remaining AND gates. Auxiliary brush and conductive segment means providing a break-before-make operation in a third track on the drum are utilized to control the inputs to the flip-flop, so that the flip-flop is triggered from one stable state to the other as the drum is rotated through the ten angular positions defined by the output brushes.

By virtue of this arrangement, there will be no drum position at which more than one AND gate has an output or at which no AND gate has an output, thereby insuring unambiguous decimal coded output information. In one embodiment of the invention, the auxiliary brush and conductive segment means of the third track on the drum take the form of ten auxiliary brushes alternately connected to the "set" and "clear" inputs of the flip-flop and a single conducting segment arranged to energize the auxiliary brushes. In another embodiment of the invention, this arrangement is replaced by two auxiliary brushes connected to the set and clear inputs of the flip-flop and ten conductive segments arranged in a "staggered" pattern in the third track, so that five segments energize each auxiliary brush. The disclosure also illustrates diode conversion matrices for converting the decimal coded output from the shaft angle encoder into binary code decimal, Gray and Gray-excess 3 codes.

BACKGROUND OF THE INVENTION

Field of the invention

This invention relates generally to analog-to-digital code converters and more particularly to an improved code converter of the shaft angle encoder type which is capable of providing unambiguous, digitally-coded output information in any desired code.

Description of the art

At the present time, computers and control systems which operate on digital principles are becoming increasingly popular because of their high degree of accuracy and flexibility of use as compared to the older systems which operate on analog principles. Unfortunately, much of the information and data to be fed into digital computers and control systems is inherently analog in nature. For example, the digital computers and control systems employed in aircraft and guided missile navigational equipment may be required to receive signals representing pressure, temperature and direction of flight which are essentially analog in nature. Very often, the input information available may be simply the angular position of a shaft forming a part of a servo system or which may be the output of an instrument. Before the digital computer or control system can utilize this analog input information it must be converted into digital form.

In converting analog information into digital information, so-called "analog-to-digital code converters" are utilized. The digital code into which the analog signal is converted depends largely upon the type of computer or control system to be utilized. For example, in some applications, the analog signal is converted into a decimal coded digital output represented by the digits ranging from 0 to 9. However, for most applications, this type of decimal coded digital output is unsatisfactory because it generally requires the use of operating equipment and components having then discrete states of operation. According, the usual practice is to utilize a digital code, such as the binary code, which has only two digits, conventionally represented as a binary "0" and a binary "1." The binary 0 and binary 1 digits may be conveniently utilized by the many circuit components and other types of equipment which have two stable states of operation. Since the "pure" binary code is based upon a series expansion of powers of "2," some difficulty is usually encountered in converting from decimal coded information to binary coded information, particularly where higher values of the decimal numbers are involved. For this reason, other binary type" codes, such as the binary coded decimal code, for example, are utilized. In this code, each digit of a decimal number is separately encoded as a binary number. For example, the decimal number 12 would appear as the pure binary number 0011, while the equivalent binary coded decimal number would be 1000 0100. The so-called "excess 3" code is utilized for convenience in certain arithmetic operations wherein number compliments are employed. In this code, each binary number is represented as three units greater than the decimal unit from which the number was converted. For example, the decimal number 12 would be 1111 in the excess 3 code which is the same as the pure binary number for the decimal number 15. A cyclic binary code, such as the Gray code, is utilized when it is desired to have a change in only one bit when going from one decimal number to the next higher or lower decimal number and is frequently employed in shaft angle encoders for this reason, since it simplifies the layout of the code pattern on the encoder drum. The Gray code representing the decimal number 12 would be 0101. Additionally, combinations of the foregoing binary type codes, such as the Gray-excess 3 code, for example, are often utilized for convenience in many computer and control applications.

In order to convert from analog to digital information, the code converters of the prior art have often utilized a coded drum and brush arrangement, wherein the surface of the drum is encoded with a plurality of electrically conductive segments which are operable to selectively energize output brushes in accordance with the angular position of the drum. The presence or absence of output signals at the various brushes represent the particular digital code into which the analog shaft position is converted. Since the pattern of conducting segments on the drum surface determines the code in which the output signals appear at the brushes, a different shaft angle encoder is usually employed for each output code desired. When it is desired to convert multidigit decimal numbers into codes, such as pure binary, Gray and excess 3, for example, the problem of "binary density" may arise with small diameter encoding drums, since the multidigit decimal numbers result in 5 or 6 bit or even larger binary "words" which are difficult to encode on a limited surface area.

Because of mechanical misalignment, gear backlash and the close manufacturing tolerances involved in laying out the pattern of conducting segments representing the code on the surface of the drum, shaft angle encoders often provide an ambiguous output. For example, the coded drum might be stopped in a position wherein two different, digitally coded output signals are produced or the drum could stop in a position where no output signal at all would be produced. Both of these conditions result in ambiguities which destroy the usefulness of the device. Accordingly, in prior art encoders it is customary to use so-called "lead" and "lag" brushes in conjunction with the coded drum surface and to employ a so-called "V-scan" logic circuit to be used with the reading out of every bit except the least significant bit in the least significant decade. In operation, "V-scan" selection logic utilizes the state of the least significant bit to determine the selection of the next significant bit and the process is continued until the last or most significant bit is read out. Accordingly, it is apparent that the complexity of the logic circuit employed will be dependent to a large extent upon the complexity and the nature of the code which must be placed upon the surface of the drum.

SUMMARY OF THE INVENTION

It is an object of this invention to provide an analog-to-digital code converter which utilizes a single, basic code configuration to produce a digital output signal, representing an analog input shaft position, which may be encoded in any desired code by means of a simple code conversion matrix.

It is a further object of this invention to provide an analog-to-digital code converter which produces an unambiguous digitally coded output in any desired code with the use of simple brush selection logic circuitry suitable for use with any number of desired output codes.

It is a still further object of this invention to provide an analog-to-digital code converter which is extremely accurate and reliable in operation and which permits of both static and dynamic interrogation with either continuous or pulsed interrogation signals for all output codes.

It is another object of this invention to provide an analog-to-digital code converter having a relatively simple basic code configuration which is especially suited for use in encoding applications involving a high binary density.

Briefly, the analog-to-digital code converter of the invention comprises a shaft angle encoder having a novel coded surface and brush configuration with a simplified brush selection logic circuit to insure unambiguous digitally-coded outputs from the converter. When ten output brushes are utilized, the output from the shaft angle encoder is in decimal coded digital form and may be easily converted to a digital output in any desired code by the use of simple diode code conversion matrices. The shaft angle encoder is formed by a plurality of output brushes spaced about an axis to represent the digital equivalents of analog information expressed as angular positions of rotation about the axis. An enabling circuit having first and second inputs and an output is provided for each output brush. The enabling circuits perform AND logic functions and produce outputs only when both of their two inputs are activated. The first input of each enabling circuit is coupled to the output brush associated therewith, while the second input is coupled to the output of bistable circuit means, such as a flip-flop circuit, for example, having only two stable operating states. When the bistable circuit is in its first stable state the second inputs of those enabling circuits associated with alternate ones of the output brushes are activated and the second inputs of the remaining enabling circuits are activated when the bistable circuit is in its second stable state. Accordingly, at any given time, the enabling circuits associated with a pair of adjacent output brushes will have one second input activated and one second input deactivated, so that the enabling circuits associated with a pair of adjacent output brushes can never be activated together to produce an ambiguous digitally coded output.

The bistable circuit means is triggered from one stable operating state to the other by the respective energization of first and second auxiliary brush means. A coded surface which may take the form of a cylindrical drum or disc, for example, is provided with electrically conductive segment means in first and second tracks which function respectively to energize the output and auxiliary brush means upon relative angular movement between the coded surface and brush means. From the standpoint of electrical operation, it is immaterial whether the brush means are fixed and the coded surface is rotated or whether the coded surface is fixed and the brush means are rotated. Accordingly, an input shaft is provided to cause relative movement between the coded surface and brush means, to thereby permit the angular position of the shaft to represent the analog information being supplied to the code converter. The conductive segment means in the first track on the coded surface function to sequentially energize the output brushes with a make-before-break operation, so that the first input of at least one enabling circuit is always in an activated state, assuming, of course, that the converter is being interrogated at the time. The conductive segment means of the second track on the coded surface function to sequentially energize alternate ones of the first and second auxiliary brush means with a break-before-make operation at angular positions about the axis of the encoder corresponding to the angular positions of the output brushes, so that both inputs of the bistable circuit means can never be energized at the same time. The conductive segment means of the first and second tracks are so spaced that the first input to an enabling circuit associated with a particular output brush is deactivated only when the second input to the enabling circuit associated with the next output brush in sequence of rotation is activated. This operation coupled with make-before-break operation of the first track serves to insure that one of the enabling circuits will always be in a state capable of producing an output upon interrogation of the converter, thereby eliminating the remaining type of ambiguous output.

In one embodiment of the invention, the first and second auxiliary brush means each comprise a group of five auxiliary brushes. The five brushes of the first group are spaced along the second track of the coded surface at the same angular positions occupied by alternate ones of the ten output brushes and are connected to one input of the bistable circuit means. The five brushes of the second group are spaced along the second track at the same angular positions occupied by the remaining five output brushes and are connected to the other input of the bistable circuit means. A single conductive segment in the second track will then perform the function of triggering the bistable circuit from one operating state to the other at each of the ten positions of the encoder. In another embodiment of the invention, the first and second auxiliary brush means each comprise a single brush and the conductive segment means of the second track of the coded surface comprise two groups of five conductive segments each. By suitably staggering the location of the ten conductive segments comprising the two groups in the second track, so that each group sequentially energizes a respective one of the two auxiliary brushes, it is possible to duplicate the electrical operation of the aforementioned first embodiment and yet eliminate eight of the ten auxiliary brushes used in that embodiment.

The nature of the invention and other objects and advantages thereof will be more readily understood by those skilled in the art after consideration of the following detailed description taken in conjunction with the accompanying drawings.

DESCRIPTION OF THE PREFERRED EMBODIMENT OF THE INVENTION

Figure 1:
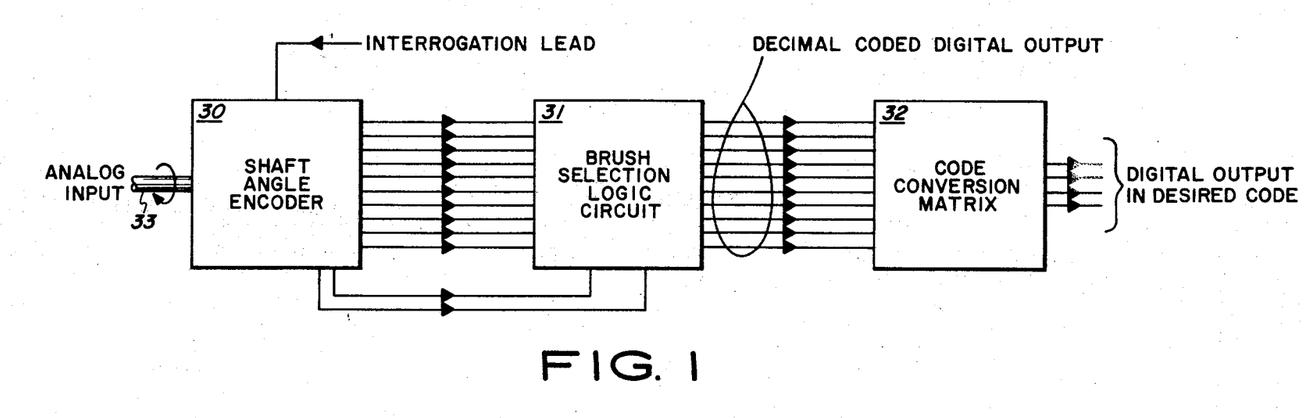
FIG. 1 is a block diagram of an analog-to-digital code converter constructed in accordance with the teachings of the present invention.

Referring now to FIG. 1 of the drawings, there is shown an analog-to-digital code converter constructed in accordance with the teachings of the present invention. The code converter is seen to comprise a shaft angle encoder 30 which functions to convert analog input information into a decimal coded digital output signal, a brush selection logic circuit 31 which functions to insure an unambiguous output from the shaft angle encoder 30, and a code conversion matrix 32 which may be employed, if desired, to convert the decimal coded digital output from the shaft angle encoder to a digital output in any other desired code, such as a binary coded decimal code, a Gray code, an excess 3 code or a Gray-excess 3 code, for example. The analog input information is fed into the code converter by mechanically rotating an input shaft 33 so that the angular position of the shaft represents the desired analog input information. The input shaft 33 may be manually set to the desired analog value or may be mechanically driven by the output from a sensing device or other instrumentation means, for example. The input shaft could also be positioned in a gear train or rotated by a servomechanism loop in which the code converter is an integral part. For example, if an analog signal such as pressure is to be applied to the converter, the pressure may be sensed by an aneroid barometer and the resulting mechanical movement amplified in a positional servo system to mechanically position the input shaft 31 to the angular position which represents the particular pressure sensed. The shaft angle encoder 30 may take any one of a variety of forms depending upon the application involved and may, for example, comprise a coded drum or disc which is arranged to selectively electrically energize a plurality of output brushes at which the decimal coded digital output signal appears. The interrogation lead shown in FIG. 1 of the drawings serves to energize the coded drum and brush arrangement to thereby "read out" the decimal coded digital output from the shaft angle encoder.

Figure 2:
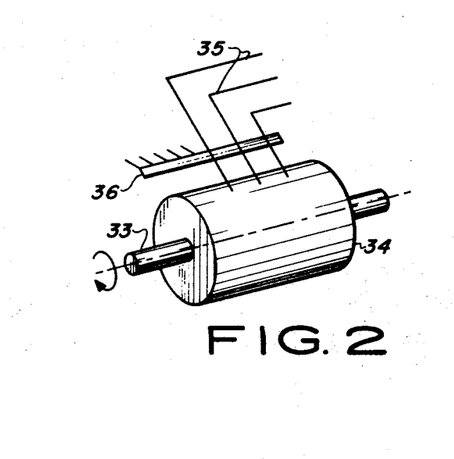
FIG. 2 is a perspective view of a movable drum and fixed brush shaft angle encoder which may be utilized in the analog-to-digital code converter of FIG. 1 of the drawings.

As shown in FIG. 2 of the drawings, the mechanical input shaft 33 of the shaft angle encoder 30 may be directly connected to a drum 34 of cylindrical shape upon which is located a pattern or code formed by a plurality of electrically conductive and nonconductive segments. A plurality of output brushes 35 are mechanically supported and fixed in position by an insulating support member 36, so that as the drum 34 is rotated by the input shaft 33, various output brushes will be energized at particular angular positions of the input shaft to thereby produce a coded output signal which depends upon the relative angular positions of the drum and the brushes.

Figure 3:
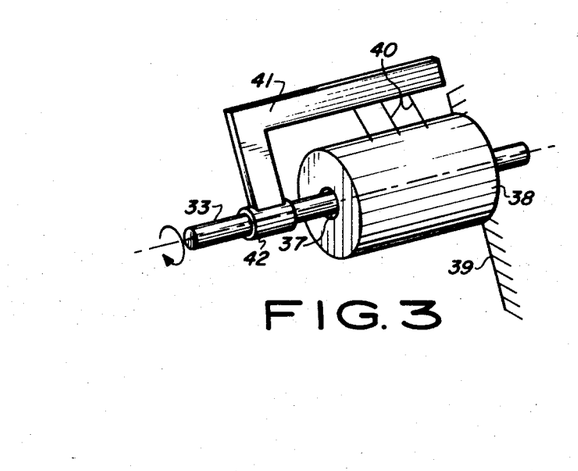
FIG. 3 is a perspective view of a fixed drum and movable brush shaft angle encoder which may also be used in the analog-to-digital code converter of FIG. 1 of the drawings.

In the arrangement shown in FIG. 3 of the drawings, the input shaft 33 of the shaft angle encoder 30 is rotatably seated in a bearing 37 which is disposed within a coded drum 38. The coded drum 38 is fixed in position and supported by an insulated support member 39, so that it is incapable of angular rotation. The output brushes 40 in this arrangement are supported for rotation about the cylindrical surface of the drum 38 by an L-shaped support arm 41 which is connected to the input shaft 33 by a collar 42. As the input shaft 33 rotates, the brushes 40 will rotate about the cylindrical surface of the drum 38 to thereby produce coded output signals. For the same configuration of output brushes and the same code pattern on the surface of the drum, the arrangement shown in FIG. 3 of the drawings will produce a coded output signal which is the same as the output signal produced by the arrangement shown in FIG. 2 of the drawings. Although the embodiment shown in FIG. 3 requires slip rings to transmit the coded signal from the brushes to its ultimate point of use, the smaller mass involved in the movable brush arrangement may be desirable for some applications because of the higher accelerations permitted. In any event, it is believed to be apparent that the shaft angle encoder 30 may take any one of a number of physical forms depending upon the application of the device.

Referring again to FIG. 1 of the drawings, it will be seen that the shaft angle encoder 30 functions to convert the angular position of the input shaft 33, which is essentially analog information, into a decimal coded digital output signal which is manifested by the appearance of an output signal on one of ten output leads which may be numbered from 0 to 9, inclusive. For some applications, such as those involving panel light indicators having ten numbered lamps or panels, for example, the decimal coded digital output from the shaft angle encoder may be used directly without conversion to any other code. Usually however, the decimal coded digital output is converted to one of a number of binary type codes, such as pure binary, binary coded decimal, Gray, excess 3 or Gray-excess 3, for example, by means of the code conversion matrix 32. In general, depending upon the convention adopted, the presence or absence of an electric output signal at any of the output leads from the code conversion matrix will indicate the reading out of a binary 1 or a binary 0 bit at the particular lead involved.

Figure 4:
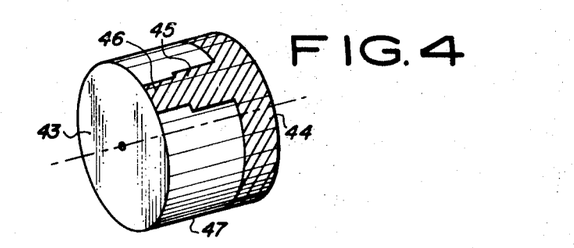
FIG. 4 is a perspective view of a coded drum which may be used with the shaft angle encoder portion of the analog-to-digital code converter of the present invention.

FIG. 4 of the drawings shows the novel code configuration of the invention applied to a cylindrical drum 43 which forms a part of the shaft angle encoder 30 and which is positioned by the input shaft 33 to feed the analog input information to the converter. The developed cylindrical surface of the drum 43 is shown in detail in FIG. 5 of the drawings and is seen to comprise three tracks designated as track A, track B and track C. Track A is a segment or strip 44 of an electrically conductive material, such as a gold alloy, for example, which completely encircles the drum 43. This track functions as the interrogation track for the code converter to "read out" the digitally encoded shaft angle position as will be more fully explained hereinafter. Track B, consists of a segment 45 of electrically conductive material which is electrically connected to the interrogation track A and which extends over an arcuate length of approximately 40° around the periphery of the coded drum 43. Track C consists of a segment 46 of electrically conductive material which is again electrically connected to the interrogation track A through the conductive segment 45 of track B and which extends over an arcuate length of approximately 30°. It may be noted that the segment 46 of Track C is centered with respect to the segment 45 of track B for reasons which will be explained hereinafter. The remaining portion 47 of the surface of the drum 43 is fabricated of an electrically non-conductive material, such as a thermosetting plastic, for example, which is selected to have a wear rate approximately equal to the wear rate of the electrically conductive segments 44, 45 and 46, to thereby minimize loss of accuracy of the converter arising from unequal wear of the conducting and nonconducting segments of the coded drum. In practice, the conducting and nonconducting segments of the drum surface are made completely flush to prevent any bouncing and chattering of the output brushes which might adversely affect the accuracy of the device and introduce electrical "noise" during high speeds of rotation. It may be noted at this time that when the interrogation track A is electrically energized by the interrogation lead shown in FIG. 1 of the drawings, the conducting segments 45 and 46 of tracks B and C respectively are also energized.

Figure 6:
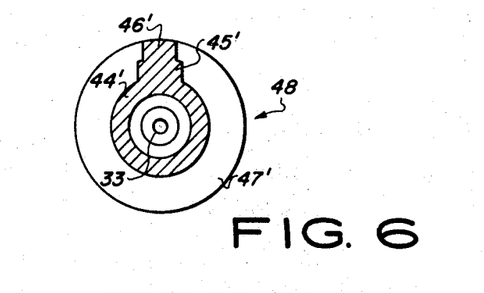
FIG. 6 is a plan view of a coded disc which may be employed instead of the cylindrical drum of FIG. 4 of the drawings in the shaft angle encoder of FIG. 1.

If desired, the coded drum 43 shown in FIG. 4 of the drawings may be replaced by a coded disc 48 which is shown in FIG. 6 of the drawings. The code configuration on the surface of the disc is electrically identical to the code configuration on the cylindrical drum 43 of FIG. 4 of the drawings and is seen to comprise a first or interrogation track 44' which extends for a full 360° about the center of the disc. Conducting segment 45', which is in the second track of the disc, has an arcuate length of approximately 40°, while conducting segment 46', which is in the third track of the disc, has an arcuate length of approximately 30° and is centrally located with respect to the segment 45' in the same manner as the corresponding segments of the embodiment shown in FIG. 4 of the drawings. The input shaft 33 of the encoder is mechanically connected to the center of the disc to rotate the disc in the same manner as the drum 43. In all respects, the electrical operation of the coded disc embodiment is identical to the operation of the coded drum of FIG. 4 of the drawings.

Figure 5:
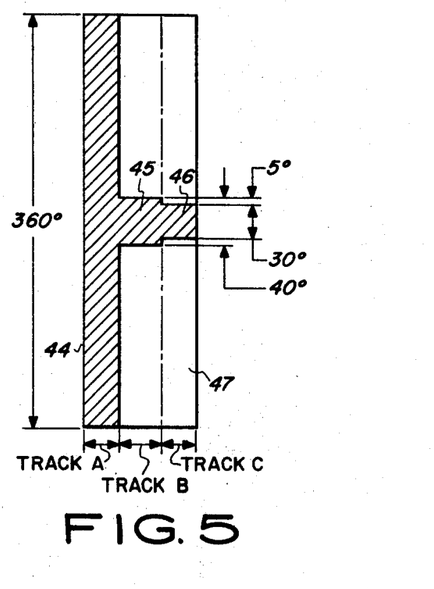
FIG. 5 is the developed cylindrical surface of the shaft angle encoder drum shown in FIG. 4 of the drawings.
Figure 7:
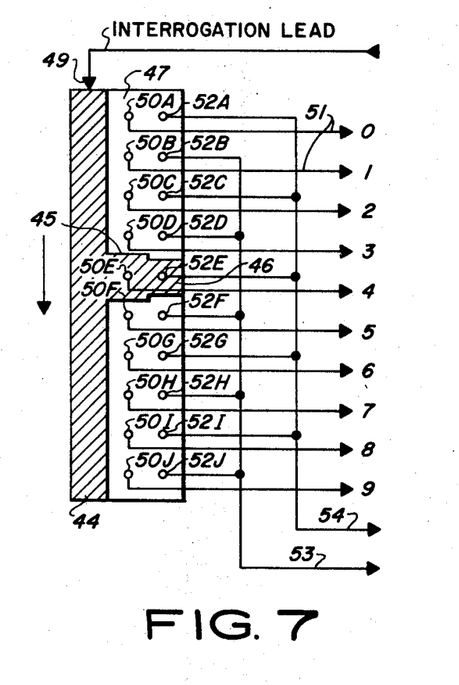
FIG. 7 is a schematic diagram showing the developed cylindrical surface of the coded drum of FIG. 4 of the drawings in relation to the output brushes and auxiliary brushes of the shaft angle encoder portion of the invention.

In FIG. 7 of the drawings, the developed cylindrical surface of the coded drum 43 of FIGS. 4 and 5 of the drawings, is shown in relation to the brush arrangement used with the shaft angle encoder 30 of FIG. 1 of the drawings. As shown in FIG. 7, the interrogation lead for the code converter is connected to an interrogation brush 49 which is in direct physical contact with the interrogation track A of the coded drum 43 so that the conducting segments in all three tracks of the drum can be readily energized for any angular position of the drum. Ten output brushes 50A through 50J are equidistantly spaced at 36° intervals around the periphery of the coded drum 43 and are arranged to contact track B of the drum which contains the conducting segment 45, so that as the drum rotates with respect to the output brushes with the clockwise direction of rotation of input shaft 33 illustrated in the drawings, the conducting segment 45 is adapted to sequentially energize output brushes 50A through 50J. It may be noted that since the spacing between the output brushes 50A through 50J is 36° and the arcuate length of the conducting segment 45 is approximately 40°, a make-before-break operating condition will exist in track B, so that electrical contact is made with one output brush before contact is broken with the preceding brush. By spacing the ten output brushes 50A through 50J at 36° intervals about the periphery of the coded drum, it may be seen that each brush represents a particular decimal coded digital value of from 0 through 9 and consequently a particular angular position of input shaft 33. Accordingly, when the interrogation track 44 is energized, one of the ten output brushes will be energized by the segment 45 in track B of the drum to thereby represent a decimal coded digital output corresponding to the angular setting or position of the analog input shaft 33. Leads 51 are connected to the output brushes 50A through 50J and are sequentially numbered from 0 to 9 to represent the ten decimal coded digital output signals corresponding to the ten analog shaft settings defined by the output brush positions.

Ten auxiliary brushes 52A through 52J are equidistantly spaced about the periphery of the cylindrical drum 43 and are arranged to be energized by the conducting segment 46 of track C of the drum. Each of the auxiliary brushes 52A through 52J occupies the same angular position as the correspondingly lettered output brush. For example, auxiliary brush 52A is at the same angular position around the axis of the input shaft as output brush 50A, auxiliary brush 52B is at the same angular position as output brush 50B, and so on. Alternate auxiliary brushes 52B, 52D, 52F, 52H and 52J are electrically interconnected by a common lead 53, while the remaining auxiliary brushes 52A, 52C, 52E, 52G and 52I are electrically interconnected by a common lead 54. By virtue of this arrangement, successive auxiliary brushes are alternately connected to either lead 53 or lead 54, so that adjacent auxiliary brushes are connected to a different one of leads 53 and 54 for purposes which will be explained hereinafter. It may also be noted that the conducting segment 46 of track C of the cylindrical drum has an arcuate length of approximately 30° which is substantially less than the 36° angular spacing between the respective auxiliary brushes 52A through 52J. This physical relationship of segment length and brush spacing provides a break-before-make operating condition for track C of the drum in contrast to the make-before-break operating condition provided for in track B of the drum.

Figure 8:
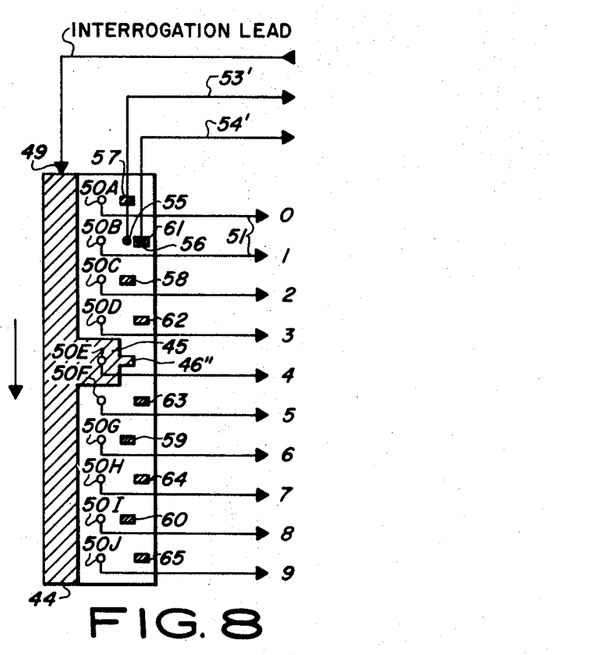
FIG. 8 is a schematic diagram similar to FIG. 7 of the drawings and shows a coded drum and brush configuration constituting an alternative embodiment of the invention.

Referring now to FIG. 8 of the drawings, there is shown a schematic diagram of the developed cylindrical surface of a coded drum and brush arrangement constituting an alternative embodiment of the invention which will produce a coded electrical output signal identical with the output signal of the brush and drum configuration shown in FIG. 7 of the drawings. As seen in FIG. 8, tracks A and B of the coded drum 43 are identical to the corresponding tracks of the coded drum shown in FIG. 7 of the drawings and permit the interrogation lead to energize the conducting segment 45 of track B of the drum through the interrogation track 44, to thereby permit output brushes 50A through 50J to be sequentially energized with a make-before-break operation by rotation of the input shaft 33. The ten auxiliary brushes 52A through 52J shown in FIG. 7 of the drawings have been eliminated and have been replaced by an auxiliary brush 55 which is arranged to contact a track $C_1$ of the coded drum and an auxiliary brush 56 which is arranged to contact a track $C_2$. The tracks $C_1$ and $C_2$ are of approximately equal width and together occupy about the same space as track C in the embodiment of FIG. 7. A conducting segment 46″, which is the electrical equivalent of conducting segment 46 in FIG. 7 of the drawings, is located in track $C_1$ and is of correspondingly smaller length and width to accommodate the smaller size of track $C_1$. Additionally, four electrically conductive segments 57, 58, 59 and 60, which are of the same physical size and shape as conducting segment 46″, are located in track $C_1$ on the drum surface. These segments in track $C_1$ are electrically connected to the interrogation track 44, so that upon rotation of the drum each of the segments 57, 58, 46″, 59 and 60 will sequentially energize auxiliary brush 55 which is connected to an output lead 53′. The five conducting segments in track $C_1$ are equidistantly spaced about the periphery of the cylindrical drum and are therefore located at 72° intervals. Accordingly, when the drum is positioned as shown in FIG. 8, conducting segment 57 is at the same angular location as output brush 50A, segment 58 is at the same angular location as output brush 50C and the remaining segments 46″, 59 and 60 are at the same angular location as the respective output brushes 50E, 50G and 50I.

Five electrically conductive segments 61, 62, 63, 64 and 65 are equidistantly disposed at 72° intervals about the periphery of the drum in track $C_2$ and are electrically connected to the interrogation track 44, so that upon rotation of the coded drum by the input shaft 33 each of the segments 61 through 65 is adapted to sequentially energize auxiliary brush 61 which is connected to an output lead 54′. It will be noted that the segments 61 through 65 in track $C_2$ of the drum are located at angular positions midway between the angular positions of the five segments in track $C_1$, so that the segments in track $C_2$ correspond to output brushes 50B, 50D, 50F, 50H and 50J for the drum position illustrated. Accordingly, upon rotation of the coded drum, the output leads 53′ and 54′ will be alternately energized at successive drum positions corresponding to the ten decimal coded output positions of the encoder. The operation of auxiliary brushes 55 and 56 in tracks $C_1$ and $C_2$ will be of the same break-before-make type found in track C of the arrangement shown in FIG. 7 of the drawings. For example, when the drum is in the position shown in FIG. 8 of the drawings, output brush 50E is energized by conducting segment 45 in track B of the drum and conducting segment 61 in track $C_2$ of the drum functions to electrically energize auxiliary brush 56 which is connected to output lead 54′. As the drum is rotated in the direction of the arrow shown in FIG. 8 of the drawings, output brush 50F will be energized by the conducting segment 45 in track B of the drum and the auxiliary brush 55 will be energized by the conducting segment 57 located in track $C_1$ of the drum. At the same time, auxiliary brush 56 will be deenergized since there is no conducting segment at that position of rotation of the drum in track $C_2$. Accordingly, it may be seen that the electrical output signals at leads 53′ and 54′ and the output leads 51 in the embodiment of FIG. 8 of the drawings are identical to the electrical output signals appearing at the corresponding leads in the embodiment of FIG. 7 of the drawings for the same shaft positions. Although the embodiment of the invention shown in FIG. 8 of the drawings eliminates eight of the ten auxiliary brushes 52A through 52J shown in the embodiment of FIG. 7 of the drawings, it requires a more complex code pattern on the drum since nine separate conducting segments must be added to track C.

Figure 9:
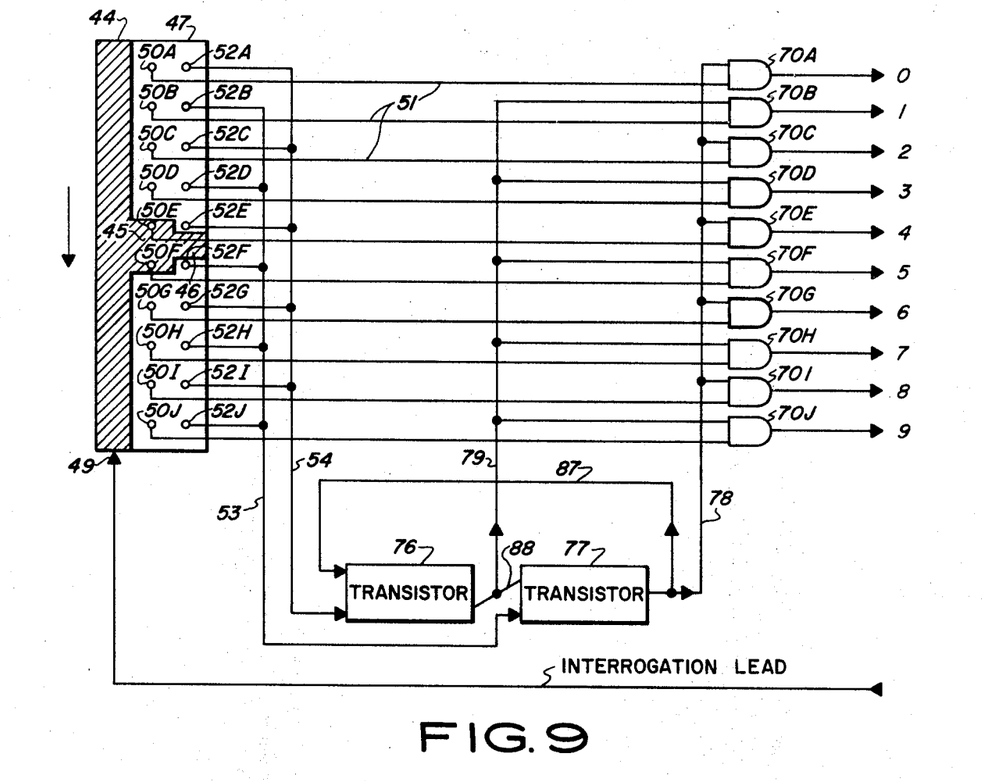
FIG. 9 is a schematic diagram of the shaft angle encoder configuration of FIG. 7 of the drawings with a suitable brush selection logic circuit.
Figure 10:
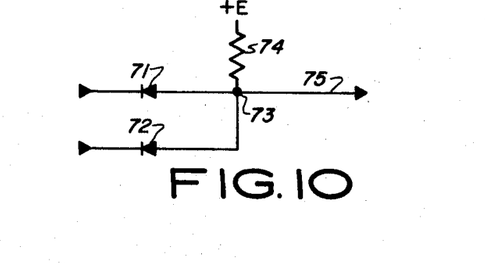
FIG. 10 is a circuit diagram of an AND gate which is suitable for use in the brush selection logic circuit of FIG. 9 of the drawings.

The brush selection logic circuit 31 of FIG. 1 of the drawings which is utilized to provide unambiguous outputs from the output brushes 50A through 50J is shown in FIG. 9 of the drawings as applied to the shaft angle encoder arrangement of FIG. 7 of the drawings. In FIG. 9, the ten output brushes 50A through 50J of the shaft angle encoder are shown as being connected by their respective output leads 51 to ten separate enabling circuits 70A through 70J which may conveniently comprise the AND gates illustrated. Each of the AND gates 70A through 70J has a single output at which a decimal coded digit may be represented by the presence or absence of a voltage. The outputs from the ten AND gates 70A through 70J are sequentially numbered from 0 to 9 to represent the ten, decimal coded output digits which define the angular position of the analog input shaft 33 of the shaft angle encoder 30. Each of the AND gates also has a pair of inputs which are required to be activated together to produce an output signal. The circuit diagram of an AND gate suitable for use with the logic circuit of FIG. 9 of the drawings is shown in FIG. 10 of the drawings as comprising diodes 71 and 72 which have their anodes connected to a common circuit junction point 73 and their cathodes arranged to receive the two separate inputs to the AND gate. The circuit junction point 73 is connected through a voltage-dropping resistor 74 to a source of direct voltage +E. The junction point 73 is also connected to an output lead 75 at which the output of the AND circuit appears. In operation, if the input potentials applied to the cathodes of both diodes 71 and 72 are equal to or greater than the potential existing at circuit junction point 73, which is the anode potential of both diodes, no current will flow through either of the diodes or through the voltage-dropping resistor 74, and consequently, the potential at circuit junction 73 and hence at the output lead 75 will be substantially the supply potential +E. If the input potential applied to the cathode of either diode 71 or diode 72 falls below the anode potential of the diode, which is the potential of circuit junction point 73, that diode wll conduct current and current will flow through the voltage-dropping resistor 74 to lower the potential at circuit junction point 73. Consequently, the output voltage appearing at lead 75 will fall to a lower value determined by the magnitude of the voltage-dropping resistor and the diode resistance. Accordingly, the output of the AND gate will only be high if both inputs to the AND gate are high. If either or both of the inputs to the AND gate become low, the output from the AND gate will become low. It may also be noted that the AND gate circuit will also perform a NOR logic function since the output of the gate will be low if any of the inputs to the gate are low.

Referring again to FIG. 9 of the drawings, it will be seen that each of the AND gates 70A through 70J has its first input connected to a respective one of the ten output brushes 50A through 50J by means of a lead 51 and the second of its inputs connected to one of the outputs of bistable circuit means, such as, for example, the flip-flop circuit formed by transistors 76 and 77. The second inputs to AND gates 70A, 70C, 70E, 70G and 70I are all connected by a lead 78 to the output of transistor 77 of the flip-flop circuit, while the second inputs to the remaining AND gates 70B, 70D, 70F, 70H and 70J are all connected by a lead 78 to the output of transistor 76 of the flip-flop circuit. It may also be noted that the input to transistor 76 of the flip-flop circuit is connected by the lead 54 to the auxiliary brushes 52A, 52C, 52E, 52G and 52I, while the input to transistor 77 is connected by lead 53 to the auxiliary brushes 52B, 52D, 52F, 52H and 52J for reasons which will be explained hereinafter.

Figure 11:
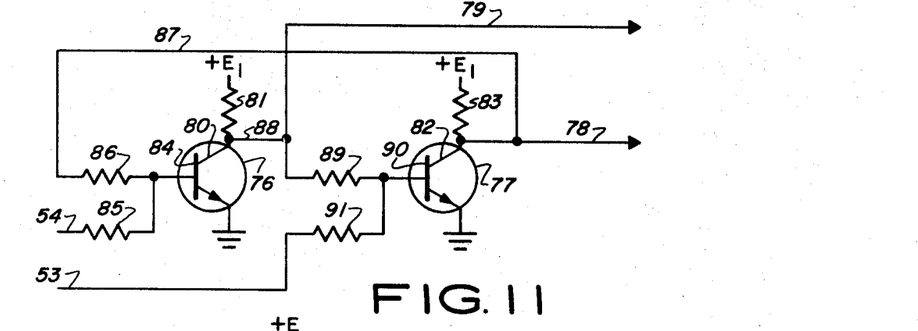
FIG. 11 is a circuit diagram of a flip-flop circuit which is suitable for use in the brush selection logic circuit of FIG. 9 of the drawings.

The circuit diagram of a suitable flip-flop circuit for the brush selection logic circuit of FIG. 9 of the drawings is shown in FIG. 11 of the drawings, wherein it is seen that transistors 76 and 77 which may be of the NPN type are each connected in the base input-grounded emitter configuration. The collector 80 of transistor 76 is connected through a voltage-dropping resistor 81 to a voltage supply source $+E_1$, while the collector 82 of transistor 77 is connected through a voltage-dropping resistor 83 to the voltage supply source $+E_1$. The base 84 of transistor 76 is connected through an input resistance 85 to the lead 54 which interconnects the auxiliary brushes 52A, 52C, 52E, 52G and 52I. The base 84 is also connected through a feedback resistance 86 and a lead 87 to the collector output 82 of transistor 77. The output from transistor 76 which appears at collector 80 is coupled by a lead 88 and an input resistance 89 to the base 90 of transistor 77. The output from the collector 80 of transistor 76 is also connected by leads 88 and 79 to the second input of AND gates 70B, 70D, 70F, 70H and 70J. The base 90 of transistor 77 is also connected by an input resistance 91 and the lead 53 to the auxiliary brushes 52B, 52D, 52F, 52H and 52J. In operation, when the voltage applied to the base 84 of transistor 76 through input resistance 85 becomes high, the transistor will saturate and the voltage at the collector 80 of that transistor, which is connected to the base 90 of transistor 77 through input resistance 89, will drop to a low value, since the internal resistance in the collector-emitter circuit of transistor 76 will decrease. With a low signal applied to the base 90 of transistor 77, that transistor will cut-off and the voltage appearing at collector 82 of that transistor will rise to a high value because the collector-emitter resistance of that transistor will increase. Since the collector voltage of transistor 77 is fed back through feedback resistance 86 and lead 87 to the base 84 of transistor 76, transistor 76 will be held in a saturated condition even though the signal applied to input resistance 85 subsequently falls to a low value. Consequently, the collector output voltage of transistor 77 which is applied by lead 78 to the AND gates 70A, 70C, 70E, 70G and 70I will remain high. This first stable operating state of the flip-flop circuit will continue until the input voltage applied to base 90 of transistor 77 through input resistance 91 becomes high, at which time transistor 77 will saturate and cause the output voltage appearing at collector 82 of that transistor to fall to a low value, thereby cutting-off transistor 76 and causing the output voltage appearing at collector 80 of that transistor to become high. At this time, since the collector 80 of transistor 76 is connected through leads 88 and 79 to the AND gates 70B, 70D, 70F, 70H and 70J, these AND gates will receive a high input voltage at their second input. Since the high voltage appearing at collector 80 of transistor 76 is also applied to the base 90 of transistor 77 through the input resistance 89, transistor 77 will be held in the saturated state even though the voltage applied to the base 90 through the input resistance 91 subsequently falls to a low value. This second stable operating state of the flip-flop circuit will continue until a high input appears on lead 54 and the circuit is shifted back to its first stable operating state.

It is believed evident from the foregoing description of the operation of the flip-flop circuit of FIG. 9 of the drawings, that the flip-flop circuit performs the function of a "memory" circuit. When the flip-flop is in its first stable operating state, it keeps the second inputs to five of the ten AND gates at a high value regardless of the loss of the signal which caused the flip-flop to assume that state initially. The high state of the second inputs to these five AND gates will remain until the flip-flop circuit is shifted to its second stable operating state, at which time the remaining five AND gates will have a high signal applied to their second inputs and the first five AND gates will have a low signal applied to their second inputs. Accordingly, at any given instant of time only five of the ten AND gates can have a high signal applied to their second inputs.

Referring again to FIG. 9 of the drawings, it will be seen that as the coded drum 43 rotates in the direction of the arrow shown in FIG. 9, the conducting segment 45 in track B of the drum will successively engage the output brushes 50A through 50J and will consequently energize in sequence the first inputs to the ten AND gates 70A through 70J. Since the arcuate length of the conducting segment 45 is greater than the arcuate spacing between the respective output brushes 50A through 50J, a make-before-break operating condition is obtained in track B, so that at any given instant of time or at any angular position of the input shaft 33, at least one of the AND gates 70A through 70J will have its first input energized, assuming, of course, that the interrogation lead is itself energized. For some positions of the input shaft and drum, such as the drum position illustrated in FIG. 9 of the drawings, for example, two AND gates will simultaneously have their first inputs in a high state since the arcuate length of the conducting segment 45 in track B is greater than the arcuate spacing between adjacent output brushes. In the FIG. 9 position, the first inputs of AND gates 70E and 70F are simultaneously energized. Since the conducting segment 46 in track C of the coded drum has an arcuate length which is less than the arcuate spacing between the auxiliary brushes 52A through 52J, a break-before-make operating condition will obtain for these brushes as the drum is rotated and at any given instant of time only one of the ten auxiliary brushes can be energized. Furthermore, since the auxiliary brushes control the operating state of the flip-flop circuit and consequently the energization of the second inputs to the AND circuits, it will be seen that at any given instant of time or at any drum position only one of the ten AND gates can have both of its inputs simultaneously energized and consequently only one of the ten AND gates will have a high output. It may also be noted that the "memory" function performed by the flip-flop circuit serves to insure that a fully activated AND gate will not be deactivated until the adjacent AND gate is activated so that there will be no drum position at which an output does not appear. For example, with the rotating drum in the angular position shown in FIG. 7 of the drawings, output brush 50E and auxiliary brush 52E will be simultaneously energized by the respective conducting segments in tracks B and C of the drum. Since output brush 50E is directly connected by lead 51 to the first input of AND gate 70E, the first input to that gate will become high. Since auxiliary brush 52E is connected by lead 54 to the base input of transistor 76, transistor 76 will become saturated and the collector output of that transistor applied to the base input of transistor 77 will fall to a low value thereby causing the output from transistor 77 which is applied to the second input of AND gate 70E through the lead 78 to become high. The high states of both the inputs to AND gates 70E will cause the output from AND gate 70E to become high, thereby indicating that a decimal coded digital value of "4" is being read out from the shaft angle encoder.

As the drum continues to rotate to the position shown in FIG. 9 of the drawings, it will be seen that the auxiliary brush 52E is no longer energized by the conducting segment 46 in track C of the drum because of the break-before-make operation. Auxiliary brush 52F is not energized at this time because the drum rotation has not yet reached that point. Accordingly, with no signal applied to either of the inputs to the flip-flop, the flip-flop will remain in its first stable operating state and the output from the flip-flop applied to the second input of AND gate 70E will remain high because of this memory function of the flip-flop. Because of the make-before-break operation of track B of the drum, the first input to AND gate 70E will continue to be high as output brush 50E is still contacted by conducting segment 45. Accordingly, even though the conducting segment 45 in track B of the drum is energizing both output brushes 50E and 50F as illustrated, only AND gate 70E will produce an output. As the drum continues to rotate, conducting segment 45 will continue to energize output brush 50E at least until conducting segment 46 in track C of the drum contacts auxiliary brush 52F. It is important to note that the arcuate lengths of segments 45 and 46 must be so proportioned in relation to the brush spacing that segment 45 will maintain contact with the output brush representing the previous encoder shaft position at least until segment 46 makes contact with the auxiliary brush at the next encoder shaft position. The arcuate lengths of 40° and 30° given in the disclosed embodiment are, of course, predicated upon brush diameters in excess of 1° and may be varied to suit drum size and brush spacing provided that the make-before-break and break-before-make operating conditions are also met. When auxiliary brush 52F is energized by segment 46, the input to transistor 77 will become high causing the transistor to saturate and produce a low output voltage. Since the output voltage from transistor 77 falls to a low value, the second input to AND gate 70E will become low and the output from that gate will become low. However, at the instant this is happening, the low output from transistor 77 is fed back to the input of transistor 76 thereby causing the output from transistor 76 to become high and consequently causing gate 70F to have a high output since both of the inputs to that gate are then in a high state. Accordingly, it will be seen that there is no angular position of the input shaft 33 at which more than one of the AND gates 70A through 70J is energized, nor will there be any position of input shaft 33 at which none of the AND gates is energized, assuming, of course, that the interrogation lead is energized at the time.

From the foregoing description, it is believed apparent that the shaft angle encoder and associated brush selection logic circuit of the analog-to-digital code converter of the invention combine to produce only unambiguous, decimal coded, digital outputs which represent the analog shaft angle fed into the converter. It is also believed apparent that the logic circuitry and brush configuration employed to accomplish result are relatively simple in nature and therefore produce savings in manufacturing and maintenance costs. Since the coded drum and brush configuration shown in FIG. 8 of the drawings is identical in electrical operation to the drum and brush configuration shown in FIG. 7 of the drawings, it is obvious that the logic circuit of FIG. 9 of the drawings would operate equally well with either embodiment of the shaft angle encoder. In a similar manner, the coded disc of FIG. 6 of the drawings could replace the described coded drum and the output brushes and auxiliary brushes suitably rearranged to accommodate the disc. Finally, it may be pointed out that, if desired, the drum or disc could be made stationary and the brushes rotated in the manner of FIG. 3 of the drawings to suit a particular application.

Figure 12:
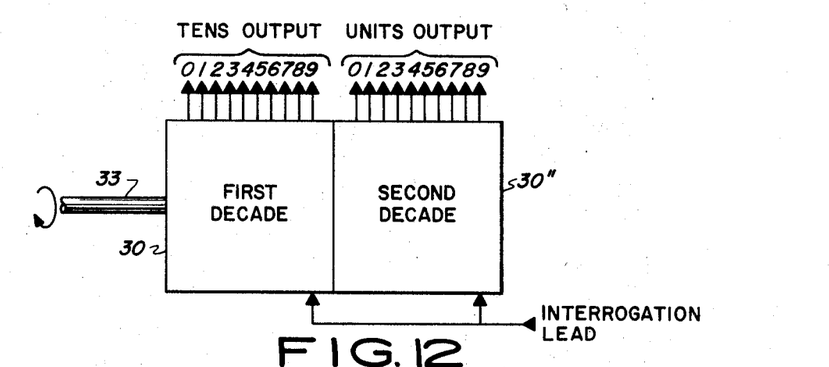
FIG. 12 is a block diagram of a two-decade, shaft angle encoder constructed in accordance with the teachings of the present invention.
Figure 13:
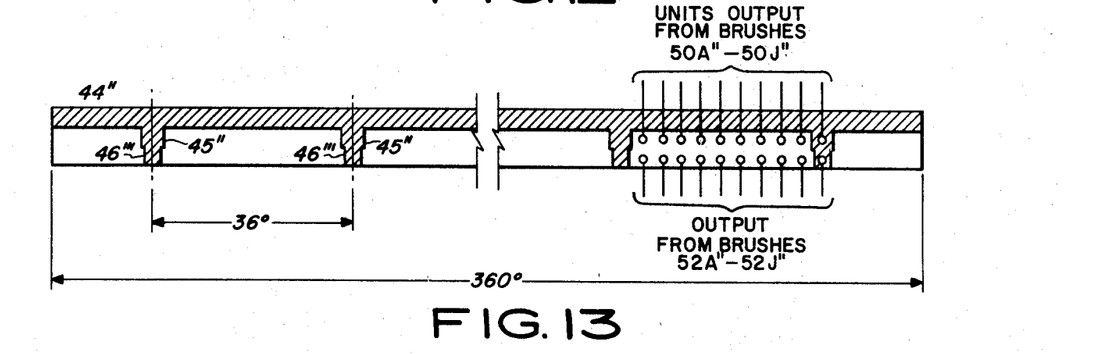
FIG. 13 is a schematic diagram showing the physical relationship between the units output brushes and the developed cylindrical surface of the coded drum of the second decade of the shaft angle encoder of FIG. 12 of the drawings, the developed drum surface being foreshortened for convenience of illustration.

The shaft angle encoder thus far described is capable of converting an analog shaft position into one of ten possible decimal coded digital outputs ranging in value from 0 to 9. Accordingly, the analog input position is converted into a single digit which is represented by a voltage appearing at one of the ten output brushes which are spaced at 36° intervals around the periphery of the coded drum. When the analog shaft position is to be converted into a decimal coded digital output with a higher degree of accuracy, i.e., with more than one digit, additional shaft angle encoders or "decades" must be employed as shown in FIG. 12 of the drawings. As seen in FIG. 12, the input shaft 33 of the encoder is connected to a first decade which may be the shaft angle encoder 30 heretofore described and which functions to convert the analog shaft position to one of ten possible digital values ranging from 0 to 9. When it is desired to represent the input shaft angle with a higher degree of accuracy, for example, with a decimal coded digital value ranging from 0 to 99, a second decade 30'' is arranged to be mechanically rotated by the input shaft 33 along with the first decade 30. Since the function of the second decade 30'' is to divide each of the 36° intervals represented by the ten outputs from the first decade into ten smaller outputs or intervals, the coded drum configuration shown in FIGS. 4, 5, 7 and 9 of the drawings must be repeated ten times around the periphery of the drum of the second decade. This arrangement is shown in FIG. 13 of the drawings wherein the developed cylindrical surface of the coded drum of the second decade encoder has been foreshortened for convenience of illustration. As seen in FIG. 13, the angular spacing between the conducting segments 46''' of track C of the drum is 36°, so that the entire code configuration is repeated ten times in the 360° development of the drum surface. However, only a single set of output brushes 50A''-50J'' and auxiliary brushes 52A''-52J'' is utilized, so that the output from these brushes will represent counting by units, while the output from the brush set of the first decade will represent counting by tens.

In a similar manner, if it is desired to represent the input shaft angle with a high degree of accuracy, such as by decimal coded values ranging from 0 to 999, for example, a third decade must be utilized and the coded configuration repeated 100 times on the cylindrical surface of the third decade drum. Since the multiple reproduction of code patterns on the surface of a drum may lead to larger drum diameters and manufacturing difficulties, it is also possible to utilize gear trains to vary the relative angular movements of a pair of coded drums each having the same code configuration. For example, if two shaft angle encoders of the type described in FIGS. 4, 5, 7 and 9 of the drawings were mechanically interconnected by a gear train having a ten to one ratio, the second drum would rotate ten times for every revolution of the first drum, so that the output from the brushes of the first drum would represent counting by tens, while the output from the brushes of the second drum would represent counting by units. The use of gearing, however, is somewhat undesirable in that positional errors due to gear backlash and manufacturing tolerances may be introduced into the output from the encoder.

Referring again to FIG. 12 of the drawings, it will be noted that the interrogation leads of the first and second decades of the shaft angle encoder are connected so that the interrogation tracks of both decades will be simultaneously energized, thereby producing simultaneous outputs at the brushes of the first and second decades. This arrangement, which provides a so-called parallel output, requires that a separate brush selection logic circuit be utilized for each decade. If the interrogation leads of the first and second decades are energized separately and at different times, it is possible to connect the brush outputs from the first and second decades to a common brush selection logic circuit, which is then time-shared among the decades to effect an economy in components. This arrangement provides a series output. Accordingly, the analog-to-digital code converter of the invention is capable of providing both parallel and series outputs to accommodate any desired application.

Figure 14:
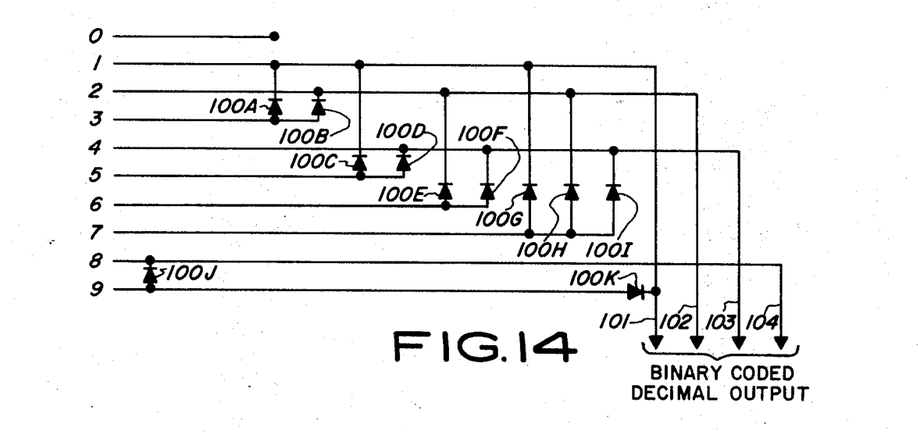
FIG. 14 is a circuit diagram of a diode code conversion matrix for converting the decimal coded digital output of the shaft angle encoder of FIG. 1 of the drawings to a binary coded decimal output.

As thus far described, the analog-to-digital code converter of the invention functions to convert an analog input shaft position into a decimal coded digital output which is represented by an output voltage or pulse appearing on one of ten output leads designated 0 through 9. If it is desired to convert the decimal coded digital output into another code, such as binary coded decimal, for example, a code conversion matrix 32 may be utilized to receive the output of the shaft angle encoder as shown in FIG. 1 of the drawings. FIG. 14 of the drawings illustrates a simple diode conversion matrix for converting the decimal output of the encoder to a binary coded decimal output. In the conversion matrix of FIG. 14, a plurality of diodes 100A through 100K are utilized to interconnect the ten output leads from the shaft angle encoder designated 0 through 9, so that binary coded decimal outputs will appear at the four output leads designated 101, 102, 103 and 104. Essentially, the diodes 100A through 100K function merely to direct or channel the output signals appearing at the respective decimal output leads 0 through 9 to selected ones of the four output leads 101 through 104, so that a binary coded decimal signal pattern appears at the four output leads. In operation, when the decimal output lead designated 0 is energized, no output will appear at any of the four output leads 101 through 104, since the binary coded decimal equivalent of decimal 0 is 0000, the convention adopted here being that the absence of a voltage indicates a binary 0 and the presence of a voltage indicates a binary 1. When the decimal coded output lead designated "1" is energized, only the output lead 101 is energized to represent a binary 1, since the diodes 100A, 100C, 100G and 100K prevent the remaining leads 102, 103 and 104 from being energized, thereby indicating a binary coded decimal output of 1000 which corresponds to a pure decimal value of 1. Similarly, when the decimal coded output lead designated 7 is energized, the diodes 100G, and 100I will conduct to energize leads 101, 102 and 103, while lead 104 is deenergized, to therefore represent at the output leads a binary coded decimal output of 1110 which corresponds to a decimal value of 7. In a like manner, each of the decimal coded output leads is interconnected by the diodes to the four output leads 101 through 104 to represent the binary coded decimal output corresponding to the decimal numbers 0 to 9.

Figure 15:
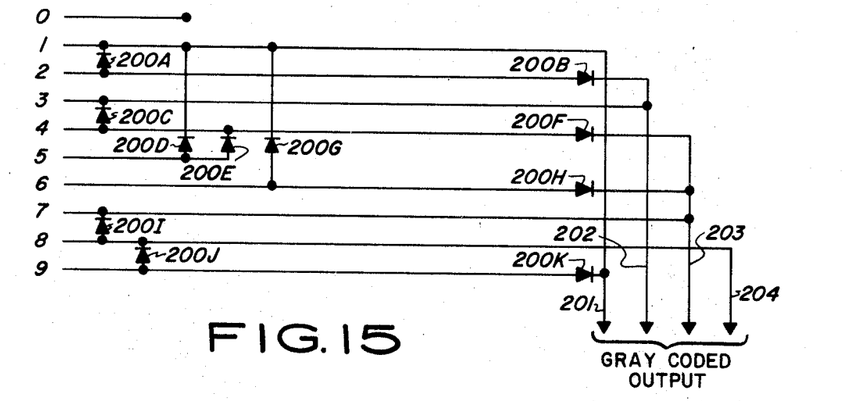
FIG. 15 is a circuit diagram of a diode code conversion matrix for converting the decimal coded signal output of the shaft angle encoder of FIG. 1 of the drawings to a Gray coded output.

FIG. 15 of the drawings illustrates a diode code conversion matrix for converting the decimal coded digital output from the shaft angle encoder 30 of FIG. 1 of the drawings into a Gray coded output. As seen in FIG. 15, the ten decimal coded output leads designated 0 through 9 from the shaft angle encoder are electrically interconnected to output leads 201, 202, 203 and 204 by a plurality of diodes 200A through 200K. Again, the diodes 200A through 200K merely serve to guide the output signals representing the decimal coded output appearing on the leads 0 through 9 to selected ones of the output leads 201 through 204, so that a corresponding Gray coded output will appear. For example, when the encoder output lead designated 0 is energized, no outputs will appear at the leads 201 through 204 since the Gray code equivalent of a decimal 0 is 000. When a voltage appears at the encoder output lead designated 2, diode 200A will conduct thereby energizing output lead 201 to represent a binary 1 and diode 200B will conduct to apply the voltage to output lead 202, to thereby produce the Gray code output of 1100 which represents the decimal number 2. When the decimal coded output lead 9 from the shaft angle encoder is energized, diodes 200J, 200I and 200K will conduct to divert or connect this output voltage to output leads 201, 203 and 204, to thereby produce a Gray coded output of 1011 which corresponds to the decimal number 9. In a similar fashion, energization of each of the remaining decimal coded output leads 0 through 9 will produce the corresponding Gray code for that decimal value at the output leads 201 through 204.

Figure 16:
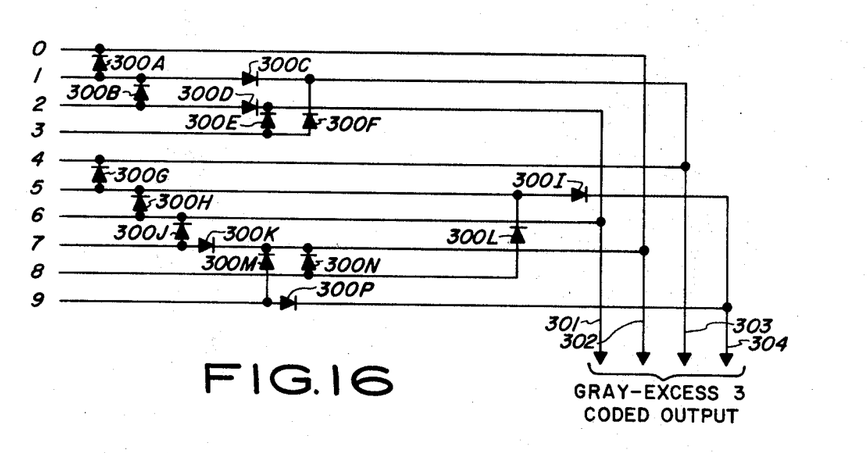
FIG. 16 is a circuit diagram of a diode code conversion matrix for converting the decimal coded digit output of the shaft angle encoder of FIG. 1 of the drawings to a Gray-excess 3 coded output.

FIG. 16 of the drawings shows a diode conversion matrix which is capable of converting the decimal coded digital output from the shaft angle encoder into a Gray-excess 3 coded output. As seen in FIG. 16, the output leads designated 0 through 9 from the shaft angle encoder 30 of FIG. 1 of the drawings are connected through a diode matrix consisting of diodes 300A through 300P to four output leads designated 301, 302, 303 and 304. In a manner similar to the diodes of the conversion matrices shown in FIGS. 14 and 15 of the drawings, the diodes of the matrix of FIG. 16 serve to selectively energize the four output leads 301 through 304 in response to signals appearing at different ones of the decimal coded output leads designated 0 through 9. In the Gray-excess 3 code, the four bit output for a particular decimal number is the Gray coded output for the decimal number 3 units greater than the selected decimal number. For example, the Gray-excess 3 code for the decimal number 0 is the same as the Gray code for the decimal number 3, while the Gray-excess 3 code for the decimal number 1 is the same as the Gray code for the decimal number 4, and so on. Accordingly, it may be seen that when the decimal coded output lead designated 0 from the shaft angle encoder 30 is energized, the only matrix output lead which is energized is lead 302 to thereby represent a binary 1 at that lead and a binary 0 at the remaining three output leads. This produces a Gray-excess 3 coded output of 0100 which corresponds to the decimal number 0. Similarly, when the decimal output lead designated 7 is energized by the shaft angle encoder, lead 301 is energized through diode 300J, lead 302 is energized through diode 300K, lead 303 is energized through diodes 300G, 300H and 300J, and lead 304 is energized through diodes 300I, 300H and 300J, to thereby produce the required Gray-excess 3 coded output of 1111. In a like manner, each of the decimal coded outputs appearing on the output leads 0 through 9 is converted into the corresponding four bit Gray-excess 3 coded output at the leads 301 through 304.

From the foregoing description of the diode matrices of FIGS. 14, 15 and 16 of the drawings, it is believed apparent that a diode conversion matrix could be designed to convert the decimal coded digital output from the shaft angle encoder of the invention into any desired code. Furthermore, if desired, a diode conversion matrix could be designed to energize character display panels, such as the so-called "7-segment" indicator panels, for example. In some applications, the use of a diode conversion matrix may be dispensed with if it is desired to use the decimal coded digital output appearing at the leads 0 through 9 in that form. An example of such use would be applications wherein ten separate indicator panels or indicator lights are to be energized by the shaft angle converter to provide a visual indication of the decimal value of the analog input information. Since the analog-to-digital code converter of the invention first converts the analog input information into a decimal coded output, it is a relatively simple matter to provide a basic shaft encoder unit which may be used with any number of different diode conversion matrices to produce an output in any desired code, thereby affording a tremendous economy in design and manufacturing costs. Furthermore, the code converter is of great value in handling the conversion of analog values into binary "words" having a large number of bits where conventional encoding techniques may result in a binary "density" which is too great to be accommodated on a small diameter drum. In the code converter of the invention, this problem may be solved by the use of additional decades to provide multidigit decimal outputs which are encoded by matrices into the desired binary code. It may also be pointed out that the analog-to-digital code converter of the invention is capable of providing both static and dynamic interrogation with either a continuous or a pulsed interrogation input.

It is therefore believed apparent that many changes could be made in the construction and described uses of the foregoing analog-to-digital code converter and many seemingly different embodiments of the invention could be constructed without departing from the scope thereof. For example, the logic employed in the brush selection logic circuit could be changed to accommodate various applications and the brush patterns and code configurations for the shaft angle encoder portion of the converter could be varied to accommodate available mechanical equipment. Accordingly, it is intended that all matter contained in the above description or shown in the accompanying drawings shall be interpreted as illustrative and not in a limiting sense.

What is claimed is:

1. An analog-to-digital code converter comprising a plurality of output brushes spaced about an axis to represent the digital equivalents of analog information expressed as angular positions of rotation about said axis; a plurality of enabling circuits each having first and second inputs and an output and each being operable to produce an output signal upon simultaneous activation of said first and second inputs; means for coupling the first input of each of said enabling circuits to a different one of said output brushes, so that each output brush has an enabling circuit associated therewith; bistable circuit means coupled to the second input of each of said enabling circuits for control thereof, said bistable circuit means having a first stable operating state in which the second inputs of those enabling circuits associated with alternate ones of said output brushes are activated and a second stable operating state in which the second inputs of the remaining enabling circuits are activated; first and second auxiliary brush means coupled to said bistable circuit means and being respectively operable upon energization thereof to cause said bistable circuit means to assume said first and second stable operating states; a coded surface having electrically conductive segments thereon and means for energizing the segments upon interrogation of the converter, said surface having a first track with conductive segment means adapted to sequentially energize said output brushes with a make-before-break operation upon relative angular movement between the surface and the output brushes and a second track with conductive segment means adapted to sequentially energize alternate ones of said first and second auxiliary brush means with a break-before-make operation at angular positions about said axis corresponding to the angular positions of said output brushes, the conductive segment means of said first and second tracks being so spaced that the first input to an enabling circuit associated with a particular output brush is deactivated only when the second input to the enabling circuit associated with the output brush next in sequence of energization is activated; and rotatable shaft means disposed along said axis for causing relative angular movement between said coded surface and brush means, to thereby produce digitally coded output signals at the outputs of said enabling circuits corresponding to angular positions of rotation of said shaft means.

2. An analog-to-digital code converter as claimed in claim 1, wherein the said brush means are fixed in position and the said rotatable shaft means comprises a shaft connected to the coded surface for rotation thereof.

3. An analog-to-digital code converter as claimed in claim 1, wherein the said coded surface is fixed in position and the said rotatable shaft means comprises a shaft and support arm upon which the brush means are mounted for rotation.

4. An analog-to-digital code converter as claimed in claim 1, wherein the said coded surface comprises a cylindrical drum having cylindrical first and second tracks thereon and said output brushes are peripherally spaced about said first track.

5. An analog-to-digital code converter as claimed in claim 1, wherein the said coded surface comprises a disc having annular, concentrically-disposed first and second tracks thereon and said output brushes are circumferentially spaced about said first track.

6. An analog-to-digital code converter as claimed in claim 1, wherein the said output brushes are ten in number and are equidistantly spaced about said axis to provide a decimal coded digital output for the converter.

7. An analog-to-digital code converter as claimed in claim 6, further comprising a plurality of diodes coupled between the outputs of said enabling circuits to form a code conversion matrix for converting the decimal coded digital output from said enabling circuits to a digital output in another desired code.

8. An analog-to-digital code converter as claimed in claim 6, wherein the said coded surface comprises a cylindrical drum with cylindrical first and second tracks, the ten output brushes are fixed in position and peripherally disposed about said first track, and the said rotatable shaft means comprise a shaft connected to the drum for rotation thereof about said axis.

9. An analog-to-digital code converter as claimed in claim 8, wherein the said means for energizing the conductive segments on the drum upon interrogation of the converter comprises a cylindrical interrogation track of electrically conductive material an an interrogation brush in contact therewith.

10. An analog-to-digital code converter as claimed in claim 9, wherein each of said enabling circuits comprises an AND gate and said bistable circuit means comprises a flip-flop circuit having one of its outputs coupled to the second inputs of those AND gates associated with alternate ones of said output brushes, the other of its outputs coupled to the second inputs of the remaining AND gates, and its set and clear inputs coupled respectively to said first and second auxiliary brush means.

11. An analog-to-digital code converter as claimed in claim 10, wherein said first auxiliary brush means comprises a first group of five auxiliary brushes disposed about said drum in the second track thereof at the same angular positions occupied by alternate ones of said output brushes, said second auxiliary brush means comprises a second group of five auxiliary brushes disposed about said drum in the second track thereof at the same angular positions occupied by the remaining output brushes, and the said conductive segment means of said second track comprises a conductive segment adapted to sequentially contact each of the ten auxiliary brushes as the drum is rotated.

12. An analog-to-digital code converter as claimed in claim 10, wherein each of said first and second auxiliary brush means comprises a single auxiliary brush disposed in the second track on said drum and said conductive segment means of said second track comprise a first group of five conductive segments disposed about said drum in the second track thereof with the same angular spacing as alternate ones of said output brushes and a second group of five conductive segments disposed about said drum in the second track thereof at angular positions midway between the angular positions of said first group of five segments, the auxiliary brushes and conductive segments of the second track being arranged in a staggered relationship, so that the five conductive segments of the first group sequentially contact the first auxiliary brush and the five conducitve segments of the second group sequentially contact the second auxiliary brush.

References Cited

UNITED STATES PATENTS

| 3,018,045 | 1/1962 | Poland | 340—347 X |
| 3,022,500 | 2/1962 | Stupar | 340—347 |
| 3,024,990 | 3/1962 | Magnuson | 340—347 X |
| 3,056,956 | 10/1962 | Retzinger | 340—347 |
| 3,268,885 | 8/1966 | Coyle et al. | 340—347 |

MAYNARD R. WILBUR, Primary Examiner

C. D. MILLER, Assistant Examiner